United States Patent

Roffey et al.

[15] 3,663,146
[45] May 16, 1972

[54] APPARATUS FOR FORMING A PLASTIC CONTAINER

[72] Inventors: William Arthur Roffey; Austin Leslie Fox, both of London, England

[73] Assignee: Molins Machine Company Limited, London, England

[22] Filed: Nov. 5, 1969

[21] Appl. No.: 874,211

Related U.S. Application Data

[63] Continuation-in-part of Ser. No. 532,652, Mar. 8, 1966, abandoned.

[30] Foreign Application Priority Data

Mar. 12, 1965 Great Britain...................10,624/65

[52] U.S. Cl...............................425/301, 264/90, 425/306, 425/398
[51] Int. Cl. ..............................B29c 17/04, B29c 17/10
[58] Field of Search .................18/19 F, 19 BM, 19 C, 5 P, 18/DIG. 3, 4 R, 4 S; 264/89, 90, 92, 295, 296; 229/44 CB, 2.5; 220/31 SR

[56] References Cited

UNITED STATES PATENTS

| | | | |
|---|---|---|---|
| 3,271,816 | 9/1966 | Schneider | 18/4 S |
| 3,520,962 | 7/1970 | Schneider | 264/90 X |
| 2,589,022 | 3/1952 | Page, Jr. et al | 18/DIG. 3 |
| 3,350,492 | 10/1967 | Grootenboer | 264/296 X |
| 3,327,887 | 6/1967 | Chalmers | 220/31 SR |
| 3,343,567 | 9/1967 | Mulligan et al | 220/31 SR X |
| 2,687,157 | 8/1954 | Cowan | 18/DIG. 3 |

Primary Examiner—Robert L. Spicer, Jr.
Attorney—Craig, Antonelli, Stewart & Hill

[57] ABSTRACT

A tool assembly is disclosed for forming a plastic container having a hinged lid which is produced from a single sheet of plastic material. The tool comprises two die members, one of which comprises two cavities over which a plastic sheet is laid and a second die member for cooperation therewith for vacuum forming the two container portions in the conventional manner with a connecting portion of plastic sheet material therebetween. At least one of the die members includes cutting members for separating the formed container from the remainder of the sheet material and also includes at least one elongated projection for compressing and causing local thinning in the connecting portion to form a hinge as the dies move together.

8 Claims, 7 Drawing Figures

APPARATUS FOR FORMING A PLASTIC CONTAINER

RELATED U.S. APPLICATION

This invention relates to methods and apparatus for forming integral hinges in plastic articles. The present application is a continuation-in-part of our copending application Ser. No. 532,652 filed Mar. 8, 1966 now abandoned.

It is now established practice to form plastic articles by drawing from thermoplastic sheet material. A portion of sheet material, heated to a sufficiently soft condition, is trapped between cooperating dies which are clamped together. One of said dies has a cavity of complementary form to the exterior of the desired article, and different fluid pressures are applied through the dies to the two faces of the trapped portion of sheet to force the latter to stretch into contact with the said one die and hence assume the desired form; the said one die is kept sufficiently cool to ensure that once the sheet is brought into contact therewith it rapidly cools to a sufficiently rigid state to preserve that form. Generally suction (i.e. subatmospheric pressure) is applied to the trapped sheet through the said one die while air pressure (i.e. superatmospheric pressure) is applied through the other die, although in a few cases (usually where slow operation can be tolerated, or where the depth of the cavity in the one die is small compared to the area of the trapped sheet) either vacuum on the one side or pressure on the other may be enough; in such cases communication to atmosphere must of course be provided through the die on the side where neither pressure nor vacuum is applied.

Very commonly, such forming employs the so-called "plug assist" technique, in which the other die has one or more projections or plugs over which the said portion of sheet material is draped before pressure and/or vacuum is applied to bring the material to the final desired form in the said one die. Such projections or plugs are not designed to conform to the desired shape of the article to be formed, but to have a shape which is, in a sense, part-way between flat sheet and said desired shape, so that drawing of the sheet to said shape is partly accomplished while the sheet is being draped over the die having the said projections or plugs, and completed when the sheet is blown and/or sucked into contact with said one die. The die having the said plugs or projections is arranged to be comparatively hot during use, as contact with it must not cool the trapped sheet portion so much that further drawing thereof is impeded.

When a plastic article so made is required to have two parts connected by an integral hinge, it is necessary to reduce the strength of a narrow strip of the formed article, along the desired hinge line, to permit ready flexure thereof.

It is an object of the present invention to provide an improved apparatus and method whereby a satisfactory integral hinge may be produced in a drawn plastic article.

According to the invention, there is provided a tool assembly for use in forming from a single sheet of plastic material a container comprising at least two portions joined together by a hinge, said tool comprising a first die member containing at least two cavities in the face of said die such that portions of said plastic sheet covering said face may be made to conform to said cavities with a connecting portion therebetween, a second die member arranged to cooperate with the face of said first die member, at least one of said die members including cutting members for separating the formed container from the remainder of the sheet material and at least one elongated raised surface portion, which may take the form of a rib, and means for moving said die members towards each other whereby said connecting portion will be compressed between said elongated raised surface portion and said first die member causing local thinning in said connecting portion to form a hinge therein as said formed container is cut and separated from the remainder of said sheet material.

At present it is preferred to apply fluid pressure, rather than direct mechanical pressure by complementary dies. It will be appreciated that when speaking of the application of fluid pressure, it is intended to include production of a subatmospheric pressure on one face of the sheet material while atmospheric pressure is allowed to act on the other face of such sheet material.

When using a tool assembly embodying the invention, as the article reaches its final form in the tool assembly the material of the or each portion which is to serve as a hinge will therefore be positively compressed between cooperating portions of the two die members. This may be contrasted with the usual state of an article formed by direct application of fluid pressure, where no part of the article is so compressed, as the sheet material is forced against the surface of one of the die members by fluid pressure applied to its other face.

The essential benefit conferred by use of such a tool assembly is that it enables the local thinning constituting the integral hinge to be produced simultaneously with the formation of the article itself and is found to yield a hinge which can be subjected to repeated flexing without fracture.

According to another feature of the invention, therefore, there is provided a method of forming a container from a single sheet of plastic material, said container comprising at least two portions joined together by a hinge, said method comprising applying a pressure differential to at least two portions of said plastic sheet material to draw said portions into contact with a die member of form complementary to that of each portion of said container and simultaneously applying mechanical compression to a part of said sheet material between said cavities to cause local thinning therein to form said hinge and cutting said formed portions and the part of said sheet material therebetween from the remainder of the sheet material.

It is often convenient that the elongated raised surface portion of one die member should be in the form of a rib or ribs, in which case we prefer to provide such rib or ribs on the die not complementary to the shape of the article, i.e. the die carrying the projections or plugs where plug-assist technique is employed as is preferred, because this die is or may be relatively hot while the die which is of such complementary form must (as explained above) be relatively cool.

With all forming apparatus of the type hereinbefore discussed (and with apparatus employing mechanical pressure) it is necessary to trim the formed articles produced, as there is at least a small undesired flange of the original sheet which is gripped by the dies to trap the portion to be formed. When this trimming is made a separate operation, the hinge or hinges may be formed simultaneously with the article or, more exactly, as the sheet is gripped by the dies to trap the desired portion thereof. If however trimming is performed by cutters secured to the dies, so that when articles are removed therefrom all undesired scrap flanges have already been trimmed off, the rib or ribs (or other elongated narrow portion(s)) will be so arranged as to complete their work immediately after formation of the article, when the dies are brought more closely together to operate such cutters, but it will be understood that this still involves no reheating of the plastic material, which is desirably kept fairly hot to facilitate the trimming operation.

Forming apparatus in which tool assemblies embodying the present invention may be used is disclosed in U.S. Pat. Nos. 3,267,523 and 3,271,816 issued on Aug. 23, 1966 and Sept. 13, 1966 respectively to Jack M. Schneider.

In order that the invention may be well understood, various preferred embodiments thereof will now be described briefly with reference to the accompanying drawings, in which.

Figure 1:
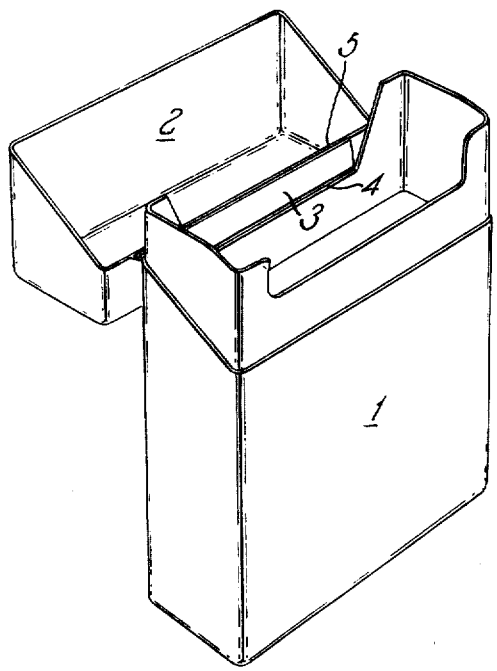
FIG. 1 shows a typical article having hinges which may be formed by use of the invention.

The article shown in FIG. 1 will readily be recognized as a cigarette packet of the so-called "hinged-lid" or "flip-top" variety; as shown this packet embodies the invention of U.S.

Pat. No. 3,327,887 issued June 27, 1967, in the names of John Walker Chalmers and William Arthur Roffey entitled "Packets for Cigarettes or the Like."

It will be seen from FIG. 1 that the packet has a body 1, a lid 2, an intermediate portion 3, and two hinges 4, 5. Hinge 4 connects the intermediate portion 3 to the body 1, while hinge 5 connects the intermediate portion 3 to the lid 2.

Turning now to FIGS. 2–6, in each of these Figures there is shown only that part of a tool assembly embodying the invention which is concerned with the production of the hinges 4, 5 (and adjacent areas) of the packet of FIG. 1.

In each of FIGS. 2–6, there is shown part of a female or die member D and part of a male or punch member P, with the intermediate portion 3 of a newly-formed packet (and adjoining areas of the body 1 and lid 2) lying therebetween. FIG. 7 shows all the operative parts of the members D, P in the same relative positions as in FIGS. 2–6, the hinge-forming parts being shown as similar to those of FIG. 2. Also shown in FIG. 7 are cutters C attached to the die member D, said cutters coacting with opposed surfaces of punch member P.

Figure 2:
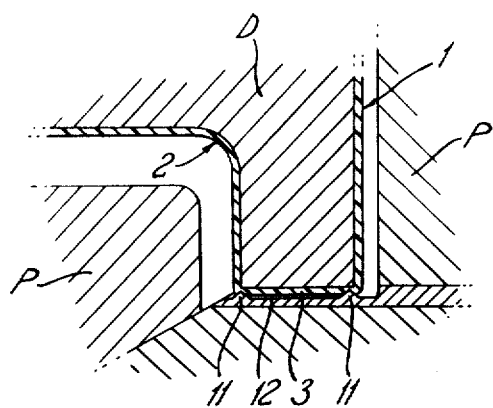
FIGS. 2–6 are large-scale sectional views of the hinge-forming parts of various forms of tool assembly embodying the invention and capable of forming the article of FIG. 1 with integral hinges.

In FIG. 2 (and FIG. 7) the punch member P has elongated raised surface portions in the form of two upstanding ribs 11 which, in the finally closed and clamped position of the assembly shown, approach a facing part of the die member so closely (e.g. to a spacing of some 0.003 inch) as to provide the desired local thinning of the plastic material. The ribs 11, as will be seen, appear symmetrical in section so as each to produce a symmetrical groove on that surface of the plastic material which will face the inside of the packet (FIG. 1) when closed. Between the ribs 11, where the intermediate portion 3 lies, the punch member P is so arranged as to be clear of the surface of the plastic material (as indicated at 12), so that the latter is not compressed except by any fluid pressure which may exist in the region where the clearance 12 is provided.

Figure 3:
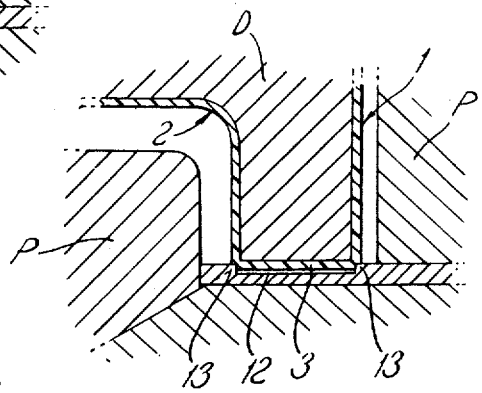

In the form of tool assembly shown in FIG. 3, instead of symmetrical ribs 11 the raised surface portions are provided in the form of asymmetric ribs 13. A right-angled corner of each rib 13 is pressed into the plastic material, to provide a groove in part of the latter which is draped around a right-angled corner of the die member D. Again a clearance 12 below portion 3 is provided.

Figure 4:
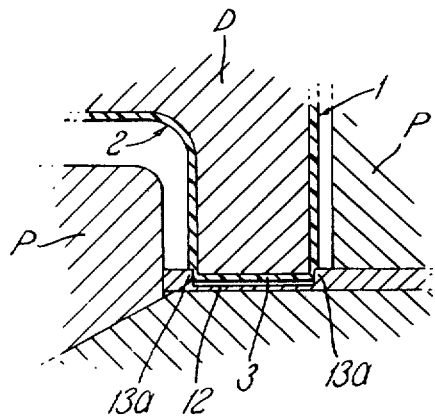

The tool assembly of FIG. 4 is essentially similar to that of FIG. 3, but has ribs 13a which differ from ribs 13 (FIG. 3) only in that they are higher i.e. they slightly overlap the opposed portion of die member D, and thus produce wider thinned hinge portions in the packet.

Figure 5:
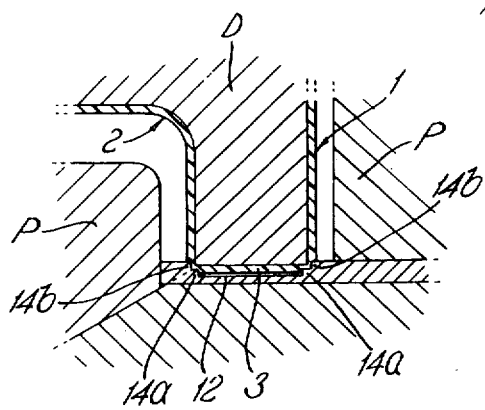

The assembly of FIG. 5 resembles those of FIGS. 3 and 4, but has a double or stepped rib for producing each hinge, so that each hinge produced will display two parallel grooves. The stepped ribs each have a lower step 14a and an upper step 14b, and they are disposed substantially symmetrically with reference to coacting corners of part of the die member D.

Figure 6:
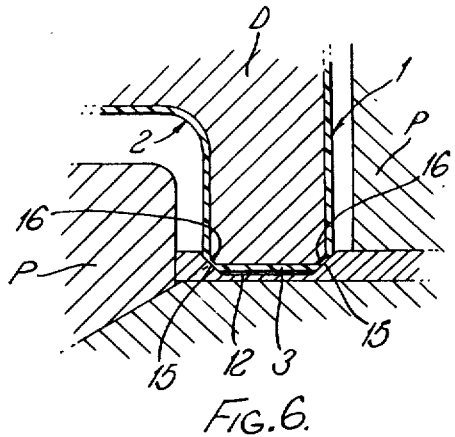
Figure 7:
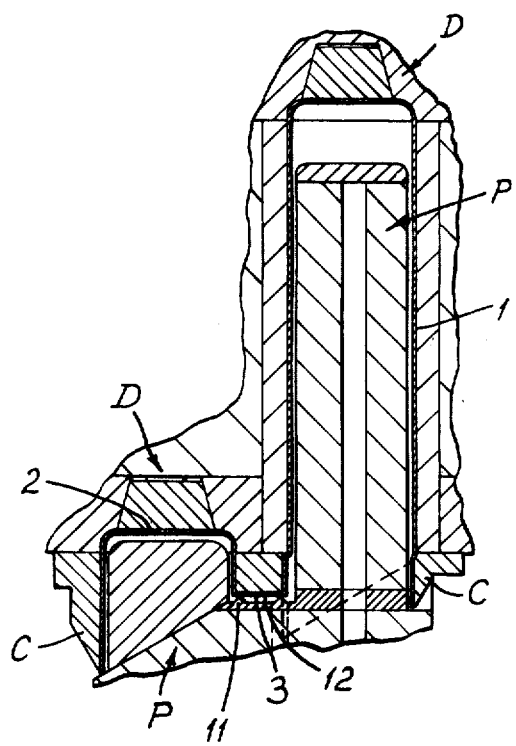
FIG. 7 is a smaller-scale sectional view of all the operative parts of such a tool assembly.

Lastly, FIG. 6 shows a somewhat different arrangement. Here both the punch member P and the die member D have raised surface portions in the form of bevelled surfaces 15, 16 respectively at each edge of that part of the die member against which intermediate portion 3 lies, the clearance between cooperating surfaces 15, 16 again being such as to produce the required compression and local thinning.

It will be seen that the invention provides a convenient and uncomplicated form of tool assembly for the purpose set out above, and enables satisfactory integral hinges to be formed in plastic articles, manufactured by pressure forming from sheet material, expeditiously and efficiently. The specific forms of tool assembly shown and described are examples only of many possible embodiments of the invention; moreover the packet shown in FIG. 1 is illustrative of only one of many articles to whose manufacture the invention may with advantage be applied.

We claim:

1. A tool assembly for use in forming from a single sheet of plastic material a container comprising at least two portions having a hinge therebetween, said tool assembly comprising a first die member containing at least two cavities in the face of said die such that portions of said plastic sheet covering said face may be made to conform to said cavities with a connection portion therebetween, a second die member arranged to cooperate with the face of said first die member, at least one of said die members including cutting members for separating the formed container from the remainder of the sheet material and at least one elongated raised surface portion, said die members being movable towards each other whereby said connecting portion of said sheet is compressed between said elongated raised surface portion and the other die member causing local thinning in said connection portion of said sheet to form a hinge therein as said formed container is cut and separated from the remainder of said sheet material.

2. A tool assembly as claimed in claim 1 in which said elongated raised surface portion comprises a rib.

3. A tool assembly as claimed in claim 2 in which said rib is provided on said second die member.

4. A tool assembly as claimed in claim 3 wherein each of said die members has a rib, said ribs being symmetrical.

5. A tool assembly as claimed in claim 3 wherein each of said die members has a rib, said ribs being asymmetrical.

6. A tool assembly as claimed in claim 5 wherein the edge of at least one of said cavities on the side adjacent another of said cavities in said first die member forms a sharp angle with the face of said first die member and each of said asymmetrical ribs comprises at least one substantially right-angled corner which produces a groove in the part of said connecting portion draped around said sharp angle.

7. A tool assembly as claimed in claim 5 wherein the edge of at least one of said cavities on the side adjacent another said cavity in said first die member is beveled and each of said asymmetrical ribs has a corresponding beveled portion, the clearance between the beveled edge of said cavity and the beveled portion of said asymmetrical rib when said die members are in cooperating position being such as to compress and cause local thinning of a part of said connecting portion.

8. A tool assembly as claimed in claim 1 wherein said second die member includes at least two plugs located to pass into said cavities pushing said sheet material into said cavities in advance thereof as said die members approach and cooperate with each other.

* * * * *